United States Patent
Jud et al.

(10) Patent No.: US 12,421,154 B2
(45) Date of Patent: Sep. 23, 2025

(54) INSTALLATION, DEVICE, AND METHOD FOR SHAPING THE MOUTH OF A HOLLOW-BODY-SHAPED PRECURSOR FROM GLASS

(71) Applicant: SCHOTT PHARMA AG & CO. KGAA, Mainz (DE)

(72) Inventors: Xaver Jud, Neukirch a.d. Thur (CH); Roman Oberhänsli, St. Gallen (CH); Hanspeter Kummer, Müllheim (DE)

(73) Assignees: SCHOTT PHARMA AG & CO. KGAA, Mainz (DE); SCHOTT PHARMA SCHWEIZ AG, St. Gallen (CH)

( * ) Notice: Subject to any disclaimer, the term of this patent is extended or adjusted under 35 U.S.C. 154(b) by 279 days.

(21) Appl. No.: 17/191,578

(22) Filed: Mar. 3, 2021

(65) Prior Publication Data
US 2021/0276912 A1 Sep. 9, 2021

(30) Foreign Application Priority Data
Mar. 3, 2020 (EP) .................................... 20160729

(51) Int. Cl.
*C03B 23/09* (2006.01)
*B65D 1/02* (2006.01)
*C03B 23/08* (2006.01)

(52) U.S. Cl.
CPC .............. *C03B 23/095* (2013.01); *B65D 1/02* (2013.01); *C03B 23/08* (2013.01)

(58) Field of Classification Search
None
See application file for complete search history.

(56) References Cited

U.S. PATENT DOCUMENTS

| | | | | |
|---|---|---|---|---|
| 2,234,308 A | * | 3/1941 | Koenig | C03B 23/095 |
| | | | | 65/294 |
| 4,441,908 A | * | 4/1984 | Zauner | C03B 23/112 |
| | | | | 65/243 |
| 6,769,276 B1 | * | 8/2004 | Kay | C03B 23/092 |
| | | | | 65/282 |
| 2020/0354255 A1 | * | 11/2020 | Gerber | C03B 23/095 |

FOREIGN PATENT DOCUMENTS

| | | |
|---|---|---|
| DE | 102004014170 | 10/2005 |
| DE | 102017011991 | 6/2019 |
| KR | 900002523 | 4/1990 |
| WO | 2019124542 | 6/2019 |

OTHER PUBLICATIONS

CN 108388084 machine translation, Nagashima, Juichi, Exposure Device, Aug. 2018 (Year: 2018).*

* cited by examiner

*Primary Examiner* — Queenie S Dehghan
(74) *Attorney, Agent, or Firm* — Ruggiero McAllister & McMahon LLC (57) ABSTRACT

A method for shaping the mouth of a hollow precursor made of glass is provided, as well as glass produced thereby. The method includes heating the mouth of the hollow precursor; introducing a mandrel along a first direction into the mouth while the hollow precursor is rotating; and pressing shaping rollers along a second direction on an outside of the mouth while the hollow precursor is rotating with the mandrel in the mouth. The first and second directions are perpendicular to one another. The method can include moving the mandrel along second and/or third directions together or separate from expanding the mandrel along the second and third directions.

13 Claims, 9 Drawing Sheets

INSTALLATION, DEVICE, AND METHOD FOR SHAPING THE MOUTH OF A HOLLOW-BODY-SHAPED PRECURSOR FROM GLASS

CROSS REFERENCE TO RELATED APPLICATIONS

This application claims benefit under 35 USC § 119 of European Application EP20170729.8 filed Mar. 3, 2020, the entire contents of which are incorporated herein by reference

BACKGROUND

1. Field of the Invention

The invention relates to methods for shaping an internal wall of the mouth of a hollow-body-shaped precursor from glass, as well as glass containers produced thereby.

2. Description of Related Art

The teaching described here relates in particular to the production of pharmaceutical glass vials. The shaping of the mouth herein represents a substantial machining step in the manufacturing of the glass vials. Methods and devices for shaping the mouth are described, for example, in DE 10 2015 111 993 A1 as well as in DE 10 2015 117 422 A1.

To this end, glass tubes which have diameters corresponding to the product requirements and thus represent suitable precursors from glass are usually vertically clamped in chucks. The chucks rotate at a specific rotating speed and are fastened in a circular manner on a plate. Machining stations which carry out various functions are disposed at fixed positions below the plate with the chucks. The plate having the chucks by way of a rotating movement is indexed from one machining station to the next. For machining, the plate having the chucks remains stationary for a defined temporal period. Each of said chucks on account of the indexing of the plate thus repeatedly passes the same machining stations, thus also a shaping system for the shaping of the mouth. The exact radial and tangential positioning of the individual chucks on the pitch circle is associated with significant issues in terms of engineering technology. Therefore, the position tolerances provided by the machine manufacturer are approx. ±0.2 mm in terms of a reference chuck.

When a glass tube that is clamped in a chuck now is indexed towards the shaping system, a mandrel (spike) moves into the glass tube. This mandrel has a diameter that corresponds to the dimensions of the product. The soft glass tube which is heated in the region of the mouth is pressed towards the mandrel by way of a spring force by shaping rollers which are moved from the outside towards the glass tube. The glass tube herein rotates on account of the driven chuck. The internal mouth diameter is created on account thereof. In the best case, the internal mouth diameter on the glass vial corresponds to the diameter of the mandrel, specifically when the central axis of the mandrel is precisely aligned with the central axis of the rotating glass tube.

Deviations of the central axis of the mandrel in relation to the central axis of the glass vial arise on account of the position tolerances of the chucks which are assembled on the plate. The mouth internal diameter is rendered so as to be of variable size on account thereof. A varying mouth internal diameter leads to a variation in terms of the mouth external diameter since the shaping rollers which press from the outside are usually only impinged with a spring force.

In the devices and methods known in the prior art for shaping the mouth of a pharmaceutical glass vial there is therefore overall the issue that the mouth of the glass vials has relatively large tolerances. Since corresponding glass vials typically serve for storing vaccine preparations, said glass vials however have to adhere to deviations from the defined nominal value which are as minor as possible. Any deviation from the nominal value can lead to the crimp not sitting tightly on the container so that the container is not sufficiently closed, that is to say that the so-called container closure integrity (CCI) is not guaranteed. Contaminations, leaking, or premature expiry of the pharmaceutical content can thus arise.

SUMMARY

The present invention is therefore based on the object of designing and refining the devices and methods of the type mentioned at the outset in such a manner that more precise manufacturing of the mouth of a precursor from glass, in particular for producing a glass vial, is enabled by way of simple means in terms of construction.

In terms of the installation, the preceding object is achieved by the features disclosed herein. Accordingly, an installation for shaping an internal wall of the mouth of a hollow-body-shaped precursor from glass, in particular for producing a pharmaceutical glass vial, having a mandrel for introducing into the mouth of the precursor along a first direction, and a mounting, wherein the mandrel is disposed on the mounting, characterized in that the mounting has a base element, and in that the mandrel is movable along a second direction in relation to the base element.

It has been recognized that the underlying object can be achieved in a particularly efficient manner when the mandrel can be aligned precisely with the mouth of the precursor and thus in alignment with the chuck holding the precursor. To this end, the mandrel is configured so as to be movable in relation to the base element such that precise aligning of the mandrel is possible specifically in that the mandrel when being introduced into the mouth of the precursor is pressed or pushed, respectively, to the desired position. A type of floating mounting of the mandrel is thus achieved such that a self-acting alignment of the mandrel with the precursor is enabled.

The term "hollow-body-shaped precursor from glass" in the context of this disclosure is to be understood such that this is, for example, a glass tube from which a pharmaceutical primary packaging, in particular a pharmaceutical glass vial, can be produced.

The term "pharmaceutical glass vial" in the context of this disclosure is to be understood such that this is a pharmaceutical primary packaging from glass, for example a vaccine container or a vial, as is used in particular for storing vaccine preparations.

The term "mouth" in the context of this disclosure describes the open end of the final product produced from the precursor. In the case of a pharmaceutical glass vial, the mouth is also referred to as a rolled edge or neck closure. The internal wall of the mouth can usually be configured so as to be either smooth, as a so-called "no blow back", or have a protrusion or a bead, as a so-called "European blow back", or have a groove, as a so-called "American blow back".

The term "plurality of pharmaceutical glass vials" in the context of this disclosure describes a vending or packaging unit of pharmaceutical glass vials. The latter are stored so as to be separated by spaces, for example, or are disposed in a holding installation, in particular a nest or a tray such that said glass vials are not in contact with one another. The plurality of pharmaceutical glass vials is usually but not mandatorily at least partially surrounded by a film and optionally sterilized. Such a packaging unit is composed of 10 or more glass vials, for example of 10 to 1000 glass vials, in particular 20 to 500 glass vials, preferably 40 to 250 glass vials. Examples of such packaging units include the iQ™ platforms of SCHOTT AG, that is to say the ready-to-use platform adaptiQ® of SCHOTT AG, for example.

The mandrel can advantageously be movable along a third direction in relation to the base element. In that the mandrel is movable along three directions in relation to the base element, said mandrel can be aligned even more precisely with the mouth of the precursor when said mandrel is being introduced into the mouth, or is introduced in the latter. Extremely minor tolerances are thus achieved in the shaping of the mouth.

The first direction, the second direction, and the third direction can in each case particularly advantageously run so as to be mutually perpendicular. A type of floating mounting is thus implemented, and the directions of movement run in a manner analogous to a Cartesian coordinate system such that the mandrel can be positioned in a particularly precise manner in the space.

Specifically, it is conceivable that the mandrel is movable along the second direction and/or along the third direction by 0.1 mm to 1.0 mm, in particular 0.2 mm to 0.8 mm, preferably 0.3 mm to 0.7 mm, in relation to the base element. Such a design embodiment has the advantage that said design embodiment can be implemented with a relative minor complexity in terms of engineering, on the one hand, and it is guaranteed, on the other hand, that the mandrel has sufficient "clearance" so as to compensate the tolerances of the chuck.

According to one further advantageous design embodiment, the mounting can have at least one compensation element which is connected to the base element, wherein the compensation element is movable along the second direction and/or along the third direction in relation to the base element, wherein the mandrel is preferably immovably disposed on the compensation element. Guiding, and thus a precise movement, of the mandrel is implemented by way of such a compensation element.

In one further advantageous manner, the base element and/or the compensation element can have at least one passage for receiving a connection element, wherein the at least one passage is dimensioned in such a manner that the connection element is disposed with clearance in the passage so as to enable a movement along the second direction and/or along the third direction. This measure in terms of construction enables a particularly simple connecting and guiding between the base element and the compensation element such that tilting of the mandrel is prevented, for example.

The mounting can particularly advantageously have a first compensation element and a second compensation element, wherein the first compensation element is connected to the base element, and the second compensation element is connected to the first compensation element, wherein the first compensation element and/or the second compensation element are/is movable along the second direction and/or along the third direction in relation to the base element, and wherein the mandrel is preferably immovably disposed on the second compensation element. The disposal of two compensation elements, wherein one of said compensation elements enables in each case the movement in one direction, is advantageous since the mandrel by said compensation elements is guided in an extremely precise manner along the second and the third direction. It is effectively avoided that the mandrel tilts, in particular when shaping the mouth of the precursor, thus when external forces act on the mandrel. This leads to a significant improvement of the tolerances of the pharmaceutical glass vial thus generated, for example.

In order for a simple connection which simultaneously enables precise guiding of the movement of the mandrel to be implemented, the base element and/or the first compensation element and/or the second compensation element can have at least one passage for receiving a connection element, wherein the passage is dimensioned in such a manner that the connection element is disposed with clearance in the passage so as to enable a movement along the second direction and/or along the third direction.

According to one advantageous design embodiment, the connection element can be configured as a pin. A simple and reliable connection can be implemented on account of such a construction.

The base element can advantageously be configured as a base plate and/or the at least one compensation element can be configured as a compensation plate. A plate-shaped design embodiment has the advantage that a connection between the various elements which prevents tilting of the mandrel is generated on a relatively large area.

The mandrel can particularly advantageously be configured as an expansion mandrel. For example, a "European blow back" and/or an "American blow back" can be generated by way of an expansion mandrel. Alternatively, it is conceivable for the mandrel to serve for producing a mouth without a "blow back", for example a single-part mouth, or without movable elements, respectively.

The underlying object is furthermore achieved by a device disclosed herein. Accordingly, a device for machining a hollow-body-shaped precursor from glass, in particular for producing a pharmaceutical glass vial, having at least one chuck for clamping the precursor, the heating installation, and an external shaping installation for shaping an external wall of the mouth of the precursor is characterized in that an installation disclosed herein.

Such a device has the advantage that precise machining of the precursor can be carried out, specifically that a mouth having extremely minor tolerances can be produced.

According to one advantageous design embodiment, a rotatable machine plate having a plurality of chucks can be disposed, and the chucks can in each case be configured so as to be rotatable. This has the advantage that indexed moving of the precursors to be machined is possible. Alternatively or additionally, the external shaping installation can have two movable shaping rollers. The external wall of the mouth of the precursors can thus be machined or shaped, respectively, in a simple manner. The shaping rollers can advantageously be impinged with a force in the direction of the external wall of the precursor.

The underlying object is furthermore achieved by a method for shaping the mouth of a hollow-body-shaped precursor from glass, in particular for producing a pharmaceutical glass vial, having an installation, comprising the following method steps: heating at least the mouth of the precursor; introducing the mandrel into the mouth of the precursor, and pressing shaping rollers from the outside onto the mouth of the rotating precursor.

A corresponding method is distinguished in that precursors which have a particularly precisely shaped mouth can be machined in relatively short time and with a minor complexity in terms of equipment.

The invention furthermore relates to a plurality of pharmaceutical glass vials, in particular produced while using installation as disclosed herein, and/or while using a device as disclosed herein, and/or while using a method as disclosed herein, having at least 10 glass vials, for example 10 to 1000 glass vials, in particular 20 to 500 glass vials, preferably 40 to 250 glass vials, wherein a mouth internal diameter of the mouth of each one of the glass vials deviates from an internal diameter nominal value by less than 0.20 mm, in particular less than 0.15 mm, preferably less than 0.1 mm, particularly preferably less than 0.05 mm, and/or wherein a mouth external diameter of the mouth of each one of the glass vials deviates from an external diameter nominal value by less than 0.20 mm, in particular less than 0.15 mm, preferably less than 0.10 mm, particularly preferably less than 0.05 mm.

Such a plurality of pharmaceutical glass vials has the advantage that said glass vials meet most stringent quality standards, this being able to be implemented in particular by using a described installation and/or by using a described device and/or by using a described method.

The internal diameter nominal value can advantageously be 7 mm or 12.6 mm, and/or the external diameter nominal value can be 13 mm or 20 mm.

The present disclosure furthermore relates to a device for machining a hollow-body-shaped precursor from glass, in particular for producing a pharmaceutical glass vial, having at least one chuck for clamping the precursor, a heating installation, and an external shaping installation for shaping an external wall of the mouth of the precursor, and an installation for shaping an internal wall of the mouth of a hollow-body-shaped precursor from glass, in particular as disclosed herein, having a mandrel for introducing into the mouth of the precursor along a first direction, and a mounting, wherein the mandrel is disposed on the mounting, wherein the device is configured for generating a mouth of a pharmaceutical glass vial, having a mouth internal diameter of the mouth which deviates from an internal diameter nominal value by less than 0.20 mm, in particular less than 0.15 mm, preferably less than 0.1 mm, particularly preferably less than 0.05 mm, and/or wherein a mouth external diameter of the mouth of each one of the glass vials deviates from an external diameter nominal value by less than 0.20 mm, in particularly less than 0.15 mm, preferably less than 0.10 mm, particularly preferably less than 0.05 mm.

There now are various possibilities of designing and refining the teaching of the present invention in an advantageous manner. To this end, reference is to be made to the explanation hereunder of preferred exemplary embodiments of the invention by means of the drawing, on the other hand. Generally preferred design embodiments and refinements of the teaching are also explained in conjunction with the explanation of the preferred exemplary embodiments of the invention by means of the drawing.

BRIEF DESCRIPTION OF THE DRAWINGS

FIG. 1b in a schematic, partially sectional, lateral view shows an enlarged fragment of the pharmaceutical glass vial from FIG. 1a;

FIG. 2b in a schematic, partially sectional, lateral view shows an enlarged fragment of the pharmaceutical glass vial from FIG. 2a;

FIG. 6a in a schematic illustration shows a plan view of part of an installation according to FIG. 5 in a further position;

DETAILED DESCRIPTION

Pharmaceutical glass vials 1, the mouth 2 thereof being able to be produced while using the teaching according to the invention are illustrated in FIGS. 1a to 2b.

Figure 1A:
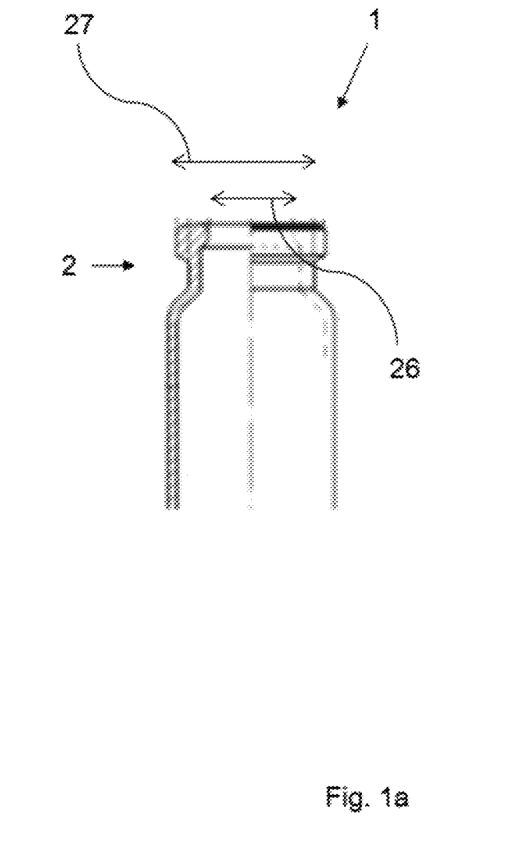
FIG. 1a in a schematic, partially sectional, lateral view shows part of a pharmaceutical glass vial.
Figure 1B:
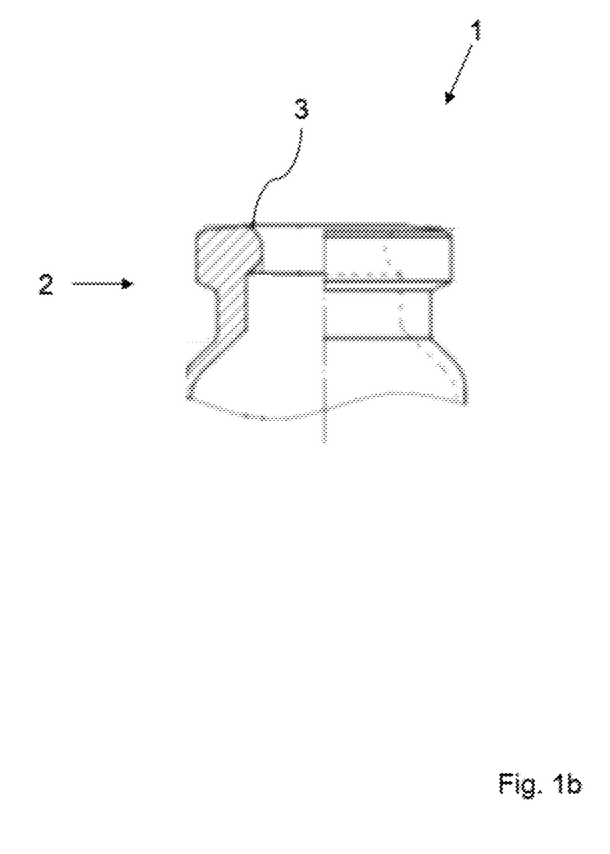

FIGS. 1a and 1b show an exemplary embodiment of pharmaceutical glass vial 1, the mouth 2 thereof on the internal wall having an encircling bead 3 which extends in the radial direction. This is thus a mouth 2 having a so-called "European blow back".

Figure 2A:
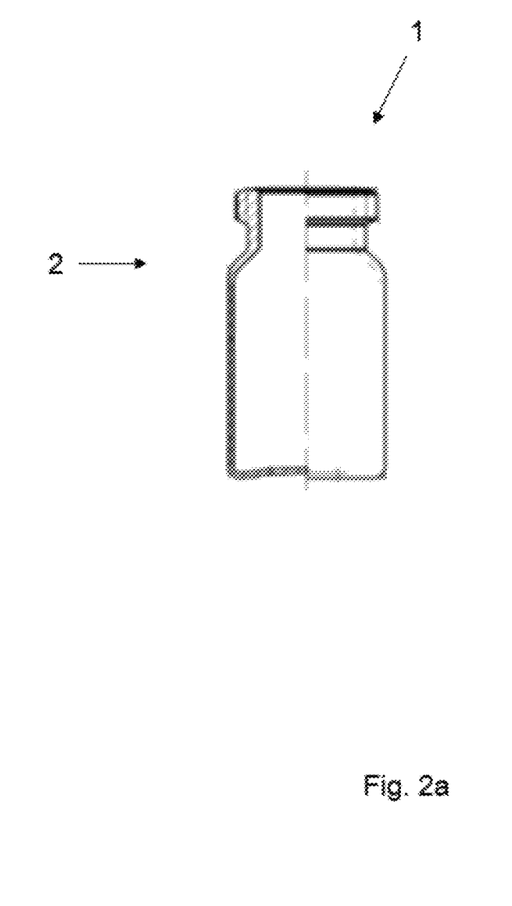
FIG. 2a in a schematic, partially sectional, lateral view shows part of a further pharmaceutical glass vial.
Figure 2B:
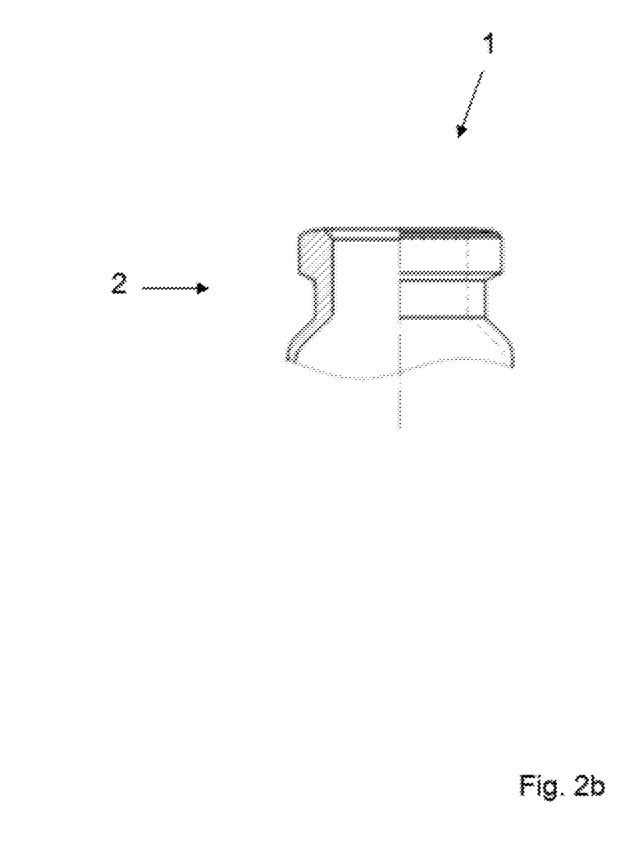

FIGS. 2a and 2b show a further exemplary embodiment of a pharmaceutical glass vial 1, the mouth 2 thereof on the internal wall being configured so as to be flat. This is thus a mouth 2 having a so-called "no blow black".

Figure 3A:
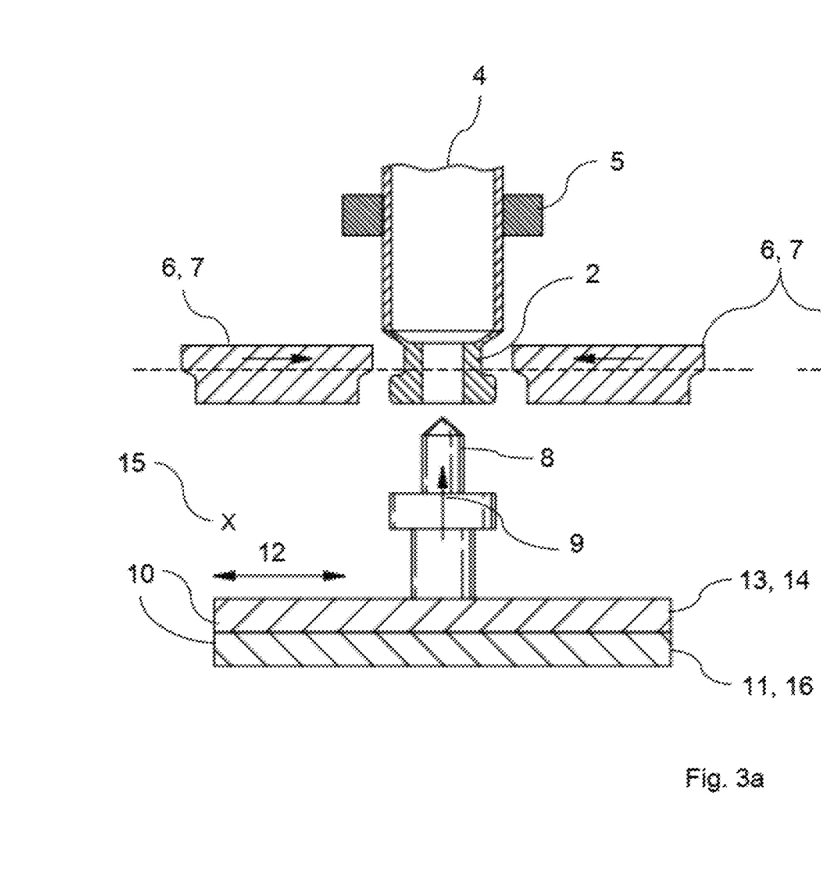
FIG. 3a in a schematic illustration shows part of a device for machining a hollow-body-shaped precursor in a first operating position.
Figure 3B:
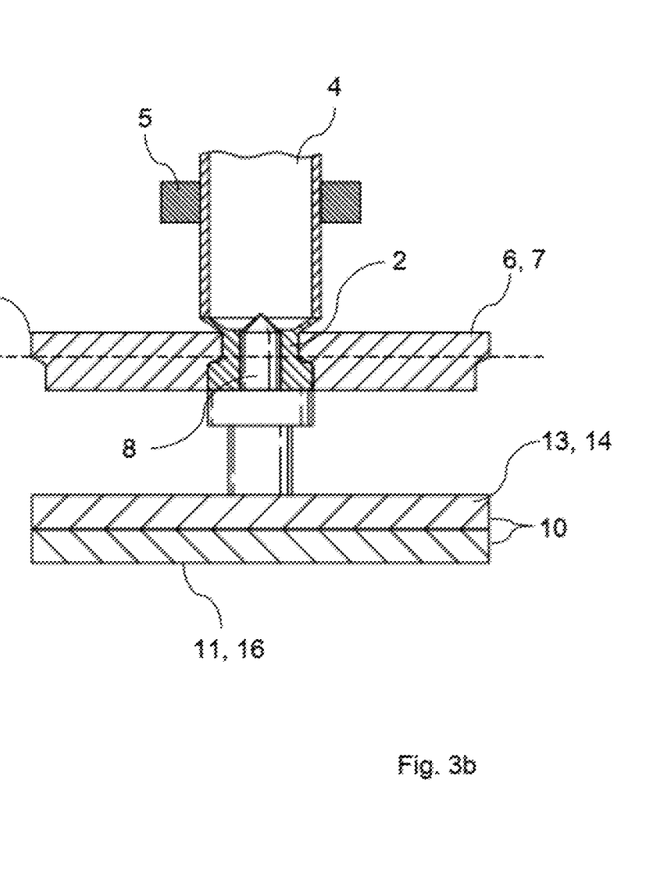
FIG. 3b in a schematic illustration shows part of a device for machining a hollow-body-shaped precursor in a further operating position.

A device for machining a hollow-body-shaped precursor 4 from glass is illustrated in FIGS. 3a and 3b. The device has a chuck 5 for clamping the precursor 4. In order for the mouth 2 of the precursor 4 to be shaped, said mouth 2 by way of a heating installation (not illustrated) is heated to the required temperature. Furthermore illustrated is an external shaping installation 6 which has two shaping rollers 7. The shaping rollers 7 are in each case movable along the arrows of said shaping rollers 7 towards the precursor 4.

A mandrel 8 for introducing into the mouth 2 along a first direction 9 is furthermore disposed. The diameter of the mandrel 8 corresponds to the mouth internal diameter 26 of the mouth 4 to be generated. The soft precursor 4 heated in the mouth region, for example by way of a spring force, is pressed by the shaping rollers 7 towards the mandrel 8, said shaping rollers 7 being moved from the outside towards the precursor 4. The precursor 4 herein rotates on account of the driven chuck 5, so that the mouth internal diameter is created.

It can moreover be seen that the mandrel 8 is disposed on a mounting 10. The mounting 10 has a base element 11 and a compensation element 13 which conjointly with the latter is movable along a second direction 12. The mandrel 8 is fixedly disposed on the compensation element 13 which is configured as a compensation plate 14. The mandrel 8, conjointly with the compensation element 13, when introduced into the mouth 2, or by the force of the shaping rollers 7, respectively, is thus moved or displaced, respectively, to an optimal alignment along the second direction 12. It is furthermore conceivable herein that the compensation element 13, or optionally a further compensation element, is also movable along a third direction 15 in relation to the base element 11, said third direction 15 in the exemplary embodiment illustrated here being identified by "x" and running perpendicularly to the drawing plane of FIGS. 3a and 3b. The mandrel 8 can thus be aligned even more precisely with the mouth 2. In the exemplary embodiment illustrated here, the base element 11 is configured as a base plate 16.

Figure 4:
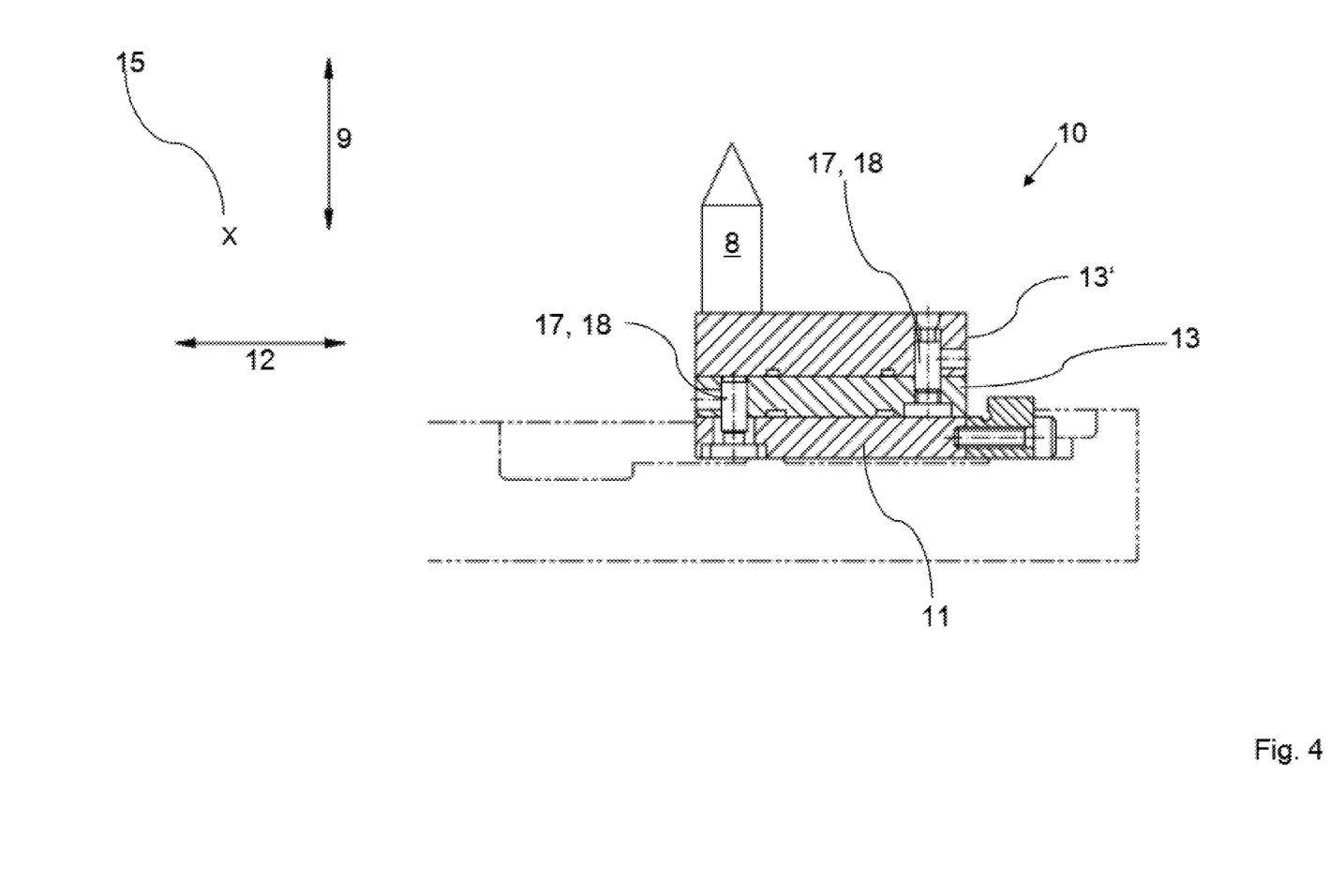
FIG. 4 in a schematic illustration shows a sectional lateral view of an exemplary embodiment of an installation according to the invention.

FIG. 4 in a schematic illustration shows a sectional lateral view of an exemplary embodiment of an installation according to the invention. The installation has a mandrel 8 which serves for introducing into the mouth of a precursor (not illustrated) along a first direction 9. The mandrel 8 is disposed on a mounting 10. The mounting 10 has a base element 11, a first compensation element 13, and a second compensation element 13'. The first compensation element 13 is movable along a second direction 12 in relation to the base element 11, and the second compensation element 13' is movable along a third direction 15 in relation to the base element 11. The third direction 15 marked by "x" herein runs perpendicularly to the drawing plane.

The base element 11 and the compensation elements 13, 13' have in each case passages 17 in which connection elements 18 implemented as pins are disposed. The passages 17 herein are dimensioned in such a manner that the compensation elements 13, 13' are movable along the second direction 12, or along the third direction 15, respectively.

Figure 5:
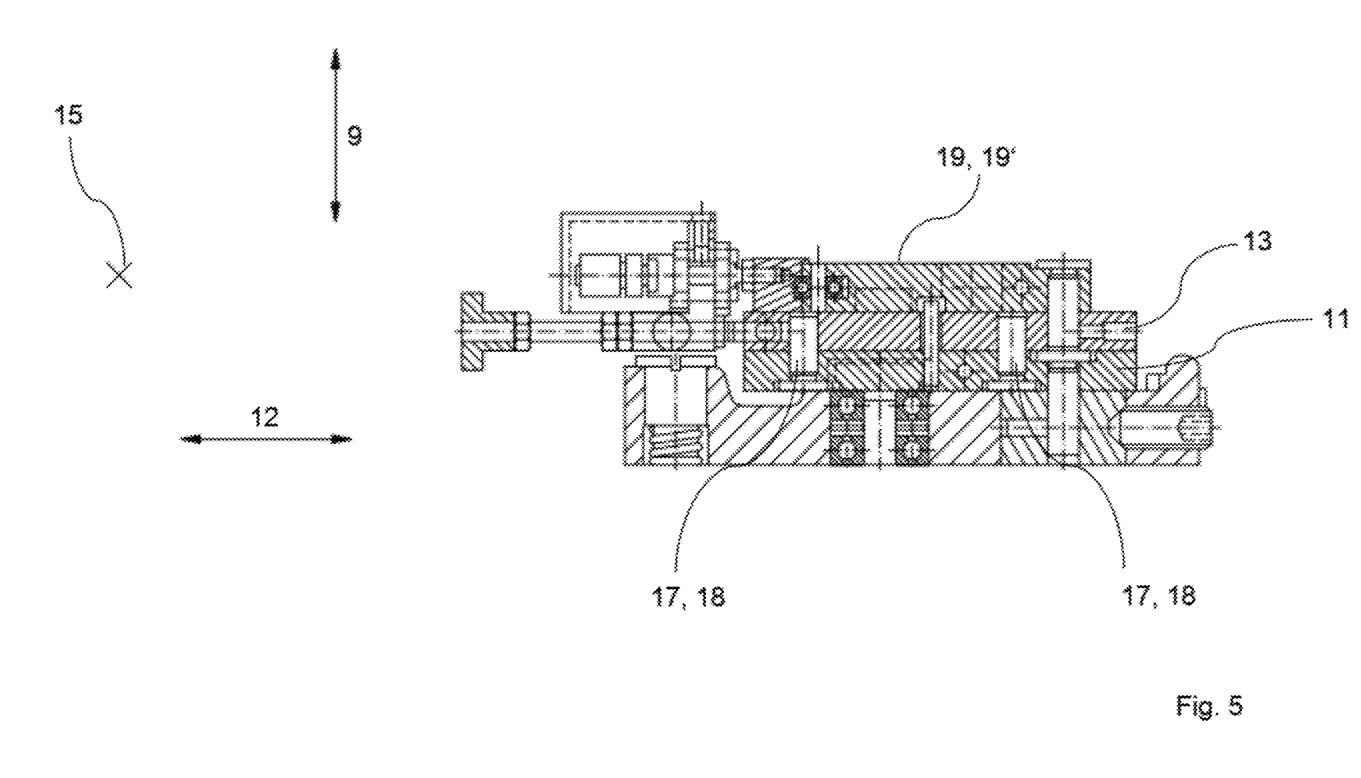
FIG. 5 in a schematic illustration shows a sectional lateral view of a further exemplary embodiment of an installation according to the invention.

FIG. 5 shows a further exemplary embodiment of an installation for shaping the internal wall of the mouth of a hollow-body-shaped precursor. The installation comprises a mounting 10 having a base element 11, and a compensation element 13 which is movable in relation to the base element 11. The base plate 11 and the compensation element 13 are connected to one another by way of connection elements 18 implemented as pins, wherein the passages 17 which receive the pins are configured in such a manner that the compensation element 13 is movable in the second direction 12 and in the third direction 15 in relation to the base element 11. The mandrel (not illustrated) of the installation is configured as an expansion mandrel which is activatable by way of two expansion arms 19, 19'. To this end, a movable conical element 20 which activates the preloaded expansion arms 19, 19' is disposed, said expansion arms 19, 19' supporting in each case one element of the expansion mandrel.

Figure 6A:
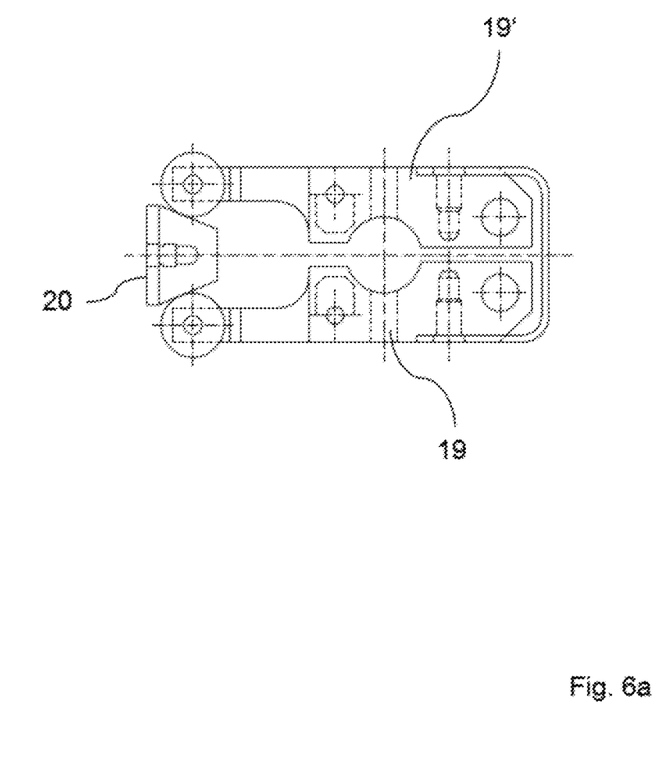
FIG. 6a in a schematic illustration shows a plan view of part of an installation according to FIG. 5 in a first position.
Figure 6B:
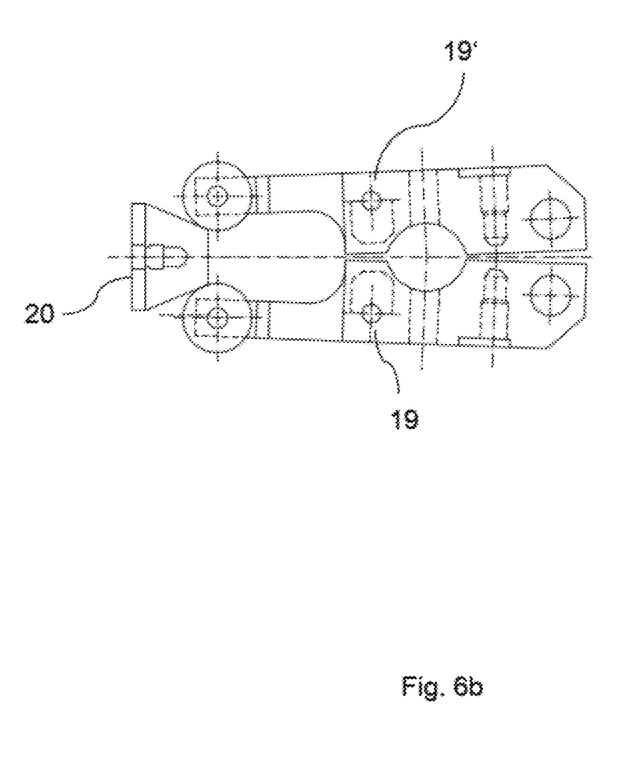

The conical element 20 as well as the expansion arms 19, 19' are shown in FIGS. 6a and 6b. FIG. 6a herein shows the operating position in which the conical element 20 has been moved in the direction of the expansion arms 19, 19' such that the elements of the expansion mandrel are moved apart in such a manner that the dimension of the desired mouth diameter is reached. FIG. 6b shows the resting position in which the expansion arms 19, 19', and thus the elements of the expansion mandrel, lie closer on one another such that the expansion mandrel can be retracted from the shaped mouth.

Figure 7:
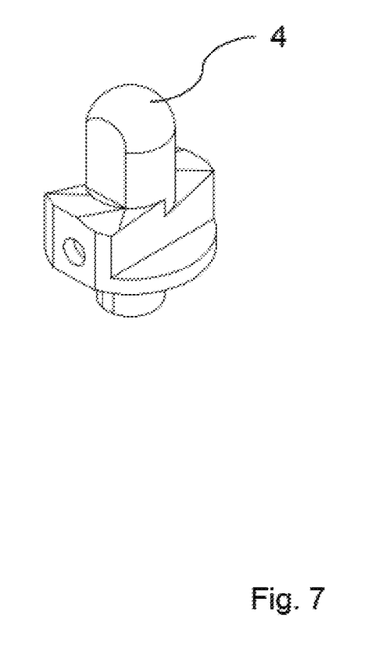
FIG. 7 in a schematic illustration shows a perspective view of a mandrel.

FIG. 7 in a schematic illustration shows a perspective view of a mandrel 8. The mandrel 8 herein is configured as a single part and serves for generating a "no blow back" mouth.

Figure 8:
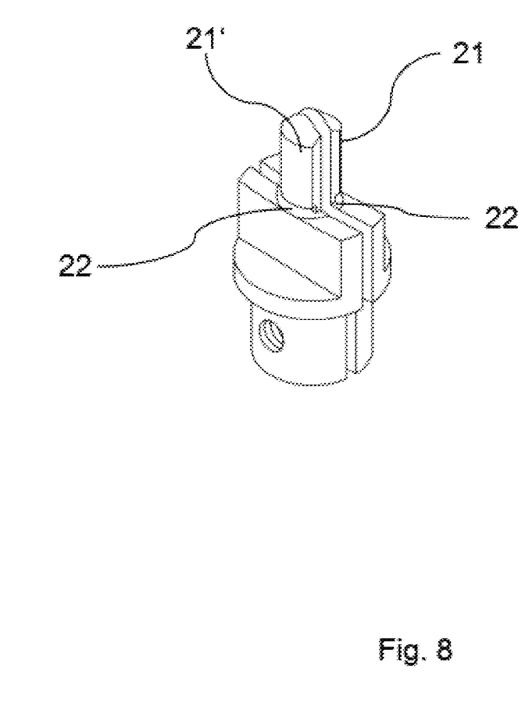
FIG. 8 in a schematic illustration shows a perspective view of a further mandrel.

FIG. 8 in a schematic illustration shows a perspective view of a mandrel 8 which is configured as an expansion mandrel. The mandrel 8 comprises two elements 21, 21', which have in each case one groove 22 such that a mouth having a "European blow back" can be shaped.

Figure 9:
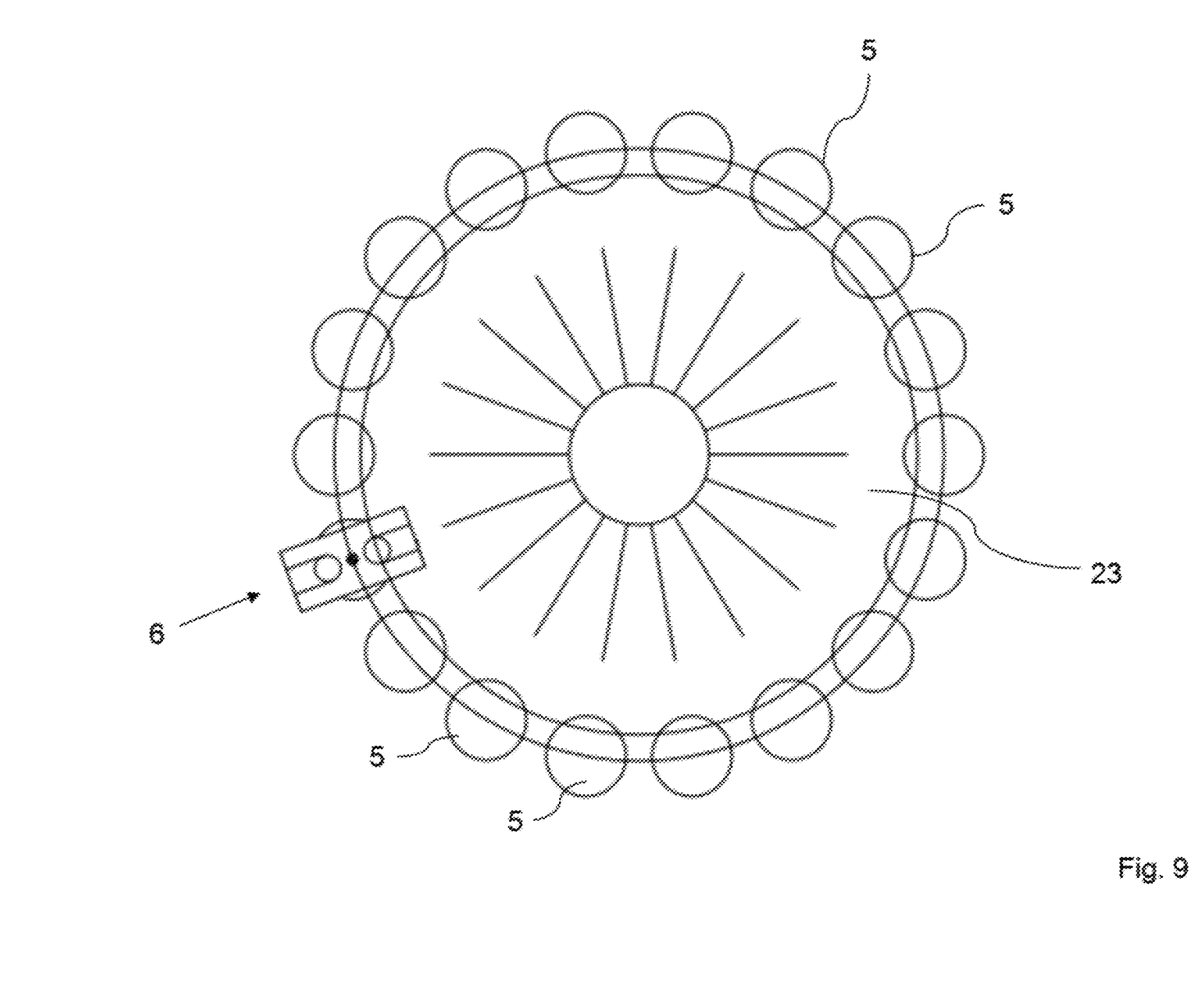
FIG. 9 in a schematic illustration shows a plan view of an exemplary embodiment of a device according to the invention.

FIG. 9 in a schematic illustration shows a plan view of an exemplary embodiment of a device according to the invention. The latter has a machine plate 23 having a plurality of chucks 5 for receiving a precursor, a heating installation, and an external shaping installation 6. An installation according to the invention for shaping an internal wall of the mouth of a hollow product is disposed below the external shaping installation 6 and is thus not visible. The machine plate 23 having the chucks 5 by way of a rotating movement is indexed from one machining station to the next. For machining, the machine plate 23 having the chucks 5 remains stationary for a defined temporal period. A total of 18 machining stations are present in this example. Each of said chucks 5 on account of the indexing of the machine plate 23 thus repeatedly passes a machining station, thus also the illustrated installation for shaping an internal wall of the mouth of a hollow product. The pitch circle diameter of the chucks 5 on the plate can be between, for example, 100 and 200 cm, depending on the respective machine type.

Figure 10:
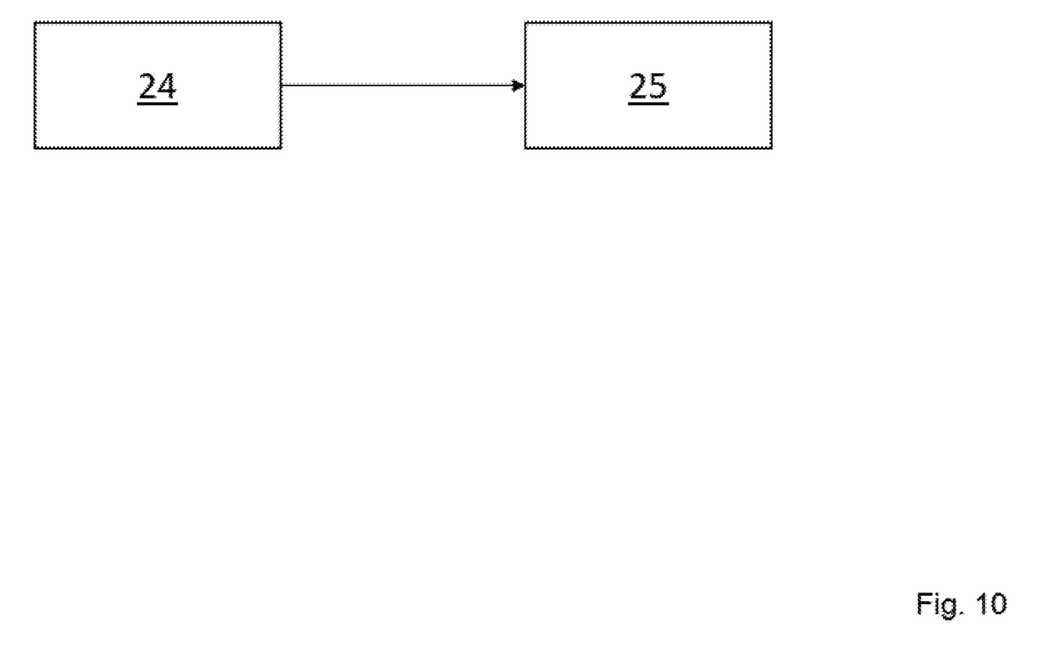
FIG. 10 shows a block diagram for visualizing an embodiment of a method according to the invention.

FIG. 10 shows a block diagram illustrating an exemplary embodiment of the method according to the invention. In a first step 24 herein, at least the mouth of the precursor is heated such that said mouth is sufficiently softened in order to be shaped. In a next step 24, the mandrel of an installation according to the invention is introduced into the mouth of the rotating precursor, and the shaping rollers are pressed from the outside onto the mouth.

It is to be pointed out here that further method steps can be carried out before, between, or after the first step 24 and the second step 25.

The deviations of the mouth internal diameter 26 and of the mouth external diameter 27 (cf. FIG. 1a) from the respective nominal value are stated in the table hereunder, in each case while using an installation according to the invention and while using a conventional mandrel which is movable only in the first direction.

|  | Deviation from nominal value with conventional installation | Deviation from nominal value with installation according to the invention |
| --- | --- | --- |
| Mouth internal diameter | ±0.2 mm | ±0.05 mm |
| Mouth external diameter | ±0.25 mm | ±0.01 mm |

It is unequivocally derived from the table that a significantly more stable production arises in particular at those diameters, wherein the further mouth dimensions also become more stable since the mouth is better formed, this leading to fewer operator interventions.

In terms of further advantageous design embodiments of the teaching according to the invention, reference is made to the general part of the description as well as to the appended claims, in order to avoid repetitions.

Finally, it is to be explicitly pointed out that the exemplary embodiments of the subject matter according to the invention described above serve only for discussing the claimed teaching but do not limit the latter to the exemplary embodiments.

LIST OF REFERENCE SIGNS

1 Glass vial
2 Mouth

3 Bead
4 Precursor
5 Chuck
6 External shaping installation
7 Shaping roller
8 Mandrel
9 First direction
10 Mounting
11 Base element
12 Second direction
13, 13' Compensation element
14 Compensation plate
15 Third direction
16 Base plate
17 Passage
18 Connection element
19, 19€ Expansion arm
20 Conical element
21, 21' Element (expansion mandrel)
22 Groove
23 Machine plate
24 First step
25 Second step
26 Mouth internal diameter
27 Mouth external diameter

What is claimed is:

1. A method for shaping the mouth of a hollow precursor made of glass, comprising:
   heating the mouth of the hollow precursor;
   introducing a mandrel along a first direction into the mouth while the hollow precursor is rotating;
   pressing shaping rollers along a second direction on an outside of the mouth while the hollow precursor is rotating with the mandrel in the mouth, the first and second directions being perpendicular to one another;
   moving the mandrel along a third direction and the second direction, wherein the first, second, and third directions are perpendicular to one another;
   guiding the mandrel so that when the mandrel is moved along any of the first, second and third directions, tilting of the mandrel is avoided;
   preventing tilting of the mandrel while the mouth is being shaped;
   enabling movement of the mandrel along the first direction by moving a base element;
   enabling movement of the mandrel along the second direction by moving a first compensation element along a first passage disposed between the first compensation element and the base element; and
   enabling movement of the mandrel along the third direction by moving a second compensation element along a second passage disposed between the first compensation element and the second compensation element, wherein movement of the mandrel is achieved by a floating mounting of the mandrel such that a self-acting alignment of the mandrel with the precursor is enabled.

2. The method of claim 1, further comprising:
   withdrawing the mandrel along the first direction from the mouth; and
   withdrawing the shaping rollers along the second direction from the outside of the mouth.

3. The method of claim 2, wherein the step of withdrawing the mandrel from the mouth occurs before or after the step of withdrawing the shaping rollers from the outside of the mouth.

4. The method of claim 2, further comprising moving the mandrel along the second direction.

5. The method of claim 2, further comprising expanding the mandrel along the second direction and the third direction while the hollow precursor is rotating with the mandrel in the mouth.

6. The method of claim 5, wherein the step of expanding the mandrel comprises expanding the mandrel before or after the step of pressing the shaping rollers on the outside of the mouth.

7. The method of claim 6, further comprising retracting the mandrel along the second and third directions while the hollow precursor is rotating with the mandrel in the mouth.

8. The method of claim 7, wherein the step of retracting the mandrel along the second and third directions occurs before or after the step of withdrawing the shaping rollers from the outside of the mouth.

9. The method of claim 7, wherein the step of retracting the mandrel along the second and third directions occurs before or after the step of withdrawing the mandrel along the first direction from the mouth.

10. A method for shaping the mouth of a hollow precursor made of glass, comprising:
    supporting a mandrel on a floating mount comprising a base element, a first compensation element movably connected to the base element via a first passage disposed therebetween, and a second compensation element movably connected to the first compensation element via a second passage disposed therebetween;
    rotating the hollow precursor;
    heating the mouth of the hollow precursor;
    moving the base element along a first direction to introduce the mandrel into an inside of the mouth while rotating the hollow precursor; and
    moving shaping rollers along a second direction perpendicular to the first direction so that the shaping rollers are pressed onto an outside of the mouth while rotating the hollow precursor with the mandrel in the inside of the mouth,
    wherein the first compensation element is movable along the second direction and the second compensation element is movable along a third direction perpendicular to both the first and second directions,
    wherein the first and second passages each receive a connection element disposed with clearance to enable the movement so that the mandrel self-aligns with the hollow precursor without tilting.

11. The method of claim 10, further comprising:
    moving the shaping rollers along the second direction so that the shaping rollers are withdrawn from the outside of the mouth while rotating the hollow precursor with the mandrel in the inside of the mouth; and
    moving the base element along the first direction so that the mandrel is retracted from the inside of the mouth while the hollow precursor is rotating.

12. The method of claim 11, wherein the step of moving the base element along the first direction so that the mandrel is retracted occurs after the step of moving the shaping rollers along the second direction so that the shaping rollers are withdrawn from the outside of the mouth.

13. The method of claim 10, further comprising, after the step of moving the base element along the first direction so that the mandrel is introduced into the inside of the mouth, expanding the mandrel along the second and third directions while rotating the hollow precursor with the mandrel in the mouth.

* * * * *